United States Patent Office 2,745,814
Patented May 15, 1956

2,745,814

SOLUTIONS OF VINYLIDENE CYANIDE INTERPOLYMERS IN NITROALKANES

Harry Gilbert, Cuyahoga Falls, and Floyd F. Miller, Wadsworth, Ohio, assignors to The B. F. Goodrich Company, New York, N. Y., a corporation of New York No Drawing. Application May 20, 1952,
Serial No. 289,014

19 Claims. (Cl. 260—32.4)

This invention relates to novel polymer solutions, and pertains more particularly to solutions of certain vinylidene cyanide interpolymers in certain nitro alkanes, especially nitromethane.

U. S. Patents 2,476,270, 2,502,412 and 2,514,387 disclose novel methods for the preparation of monomeric vinylidene cyanide, which is a clear liquid at room temperature and a crystalline solid at 0° C., possessing a melting point when in purest form of about 9.7° C., and which undergoes on contact with water an instantaneous homopolymerization reaction to give a solid water-insoluble resin. On copolymerization of this monomer in mass or in anhydrous organic medium with various other polymerizable materials there are obtained interpolymers which are extremely useful in the preparation of filaments, films and shaped articles possessing many valuable properties including high tensile strengths, low elongation and excellent resistance to the action of chemicals and the weather.

Many interpolymers of vinylidene cyanide with other monoolefinic monomers are particularly unique and useful in that they possess the unusual 1:1 alternating structure, that is, they possess essentially the structure

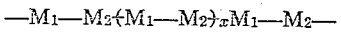

wherein each $M_1$ is a vinylidene cyanide unit of the structure

each $M_2$ is a unit of the monoolefinic comonomer polymerized with the vinylidene cyanide, and $x$ is a number, preferably in excess of 100. Analysis of such interpolymers shows that they contain 50 mole per cent ±5 mole per cent of vinylidene cyanide units regardless of the degree of monomer to polymer conversion, and hence they are essentially 50 mole per cent alternating interpolymers.

It has been found, however, that many economical solvents ordinarily employed to dissolve more conventional polymeric materials do not possess sufficient solvent power to dissolve such alternating vinylidene cyanide interpolymers. Moreover the few known solvents for such interpolymers are quite expensive and/or not available in commercial quantities.

Accordingly it is an object of this invention to provide economical and commercially available materials which possess a high degree of solvent power for essentially 50 mole per cent alternating vinylidene cyanide interpolymers. Another object is to provide colorless, stable solutions of such vinylidene cyanide interpolymers which solutions possess a viscosity such that they are highly suitable for use in the preparation of shaped articles, as in the spinning of fibers and the casting of films. Other objects of the invention will be apparent from the description which follows.

It has now been discovered that the above and other objects are readily attained by dissolving such vinylidene cyanide interpolymers in nitroalkanes which possess the structure $RNO_2$, wherein R is an alkyl radical preferably containing from 1 to 4 carbon atoms. Such nitroalkanes may be utilized alone, or with other compatible solvents for vinylidene cyanide interpolymers, or they may even be used in combination with equal or lesser amounts of other organic solvents compatible therewith such as dioxane, acetone, and the like, which are in themselves non-solvents for vinylidene cyanide copolymers under normal conditions of temperature and pressure. The resulting solutions, especially those containing from about 8 to 30% of vinylidene cyanide interpolymer are clear and viscous, and remain so on storage, and are extremely valuable in the spinning of fibers and the casting of films.

The nitroalkanes which possess the structure $RNO_2$, wherein R has the same significance as above, and which are useful solvents for vinylidene cyanide interpolymers include nitromethane, nitroethane, nitropropane, nitrobutanes, nitropentanes, nitrooctanes and the like. Nitromethane, which is economically available in commercial quantities, and which possesses the relatively low boiling point of 101° C. which is important in column spinning of fibers, is an especially preferred solvent for vinylidene cyanide interpolymers. Mixtures of nitromethane with equal amounts of dioxane, which itself is a non-solvent, are also especially useful as are mixtures of nitromethane with other solvents for vinylidene cyanide interpolymers such as dimethyl formamide and acetonitrile.

The vinylidene cyanide interpolymers which form useful spinning and casting solutions in nitroalkanes according to this invention include any interpolymer of vinylidene cyanide with one or more monoolefinic monomers copolymerizable therewith provided that the interpolymer contains from 45 to 55 mole per cent of vinylidene cyanide units. In a polymer of such vinylidene cyanide content the nature of the remaining units, derived from monoolefinic monomer, is not critical. However, in order to obtain such an interpolymer it is preferable to employ in the interpolymerization at least one monoolefinic monomer which copolymerizes with vinylidene cyanide to form an essentially 1 to 1 (or 50 mole per cent) alternating copolymer.

Among the polymerizable monoolefinic compounds which form the essentially 1:1 alternating copolymers with vinylidene cyanide are included, by way of example, the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in copending application, Serial No. 115,562, filed September 13, 1949 now U. S. Patent 2,615,866, issued October 28, 1952. Solutions of these two-component copolymers in organic nitriles form a particularly preferred class of compositions within the scope of this invention;

(2) Vinyl esters of the structure

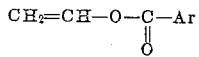

wherein Ar is an aromatic radical in which all the hydrogen atoms are attached to carbon atoms, such as vinyl benzoate; homologs of vinyl benzoate of the formula

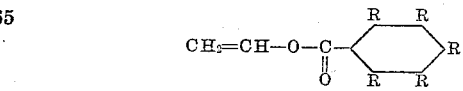

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in copending application, Serial No. 115,563, filed September 13, 1949, now U. S. Patent 2,615,867, issued October 28, 1952;

(3) Styrene and substituted styrenes of the general formula

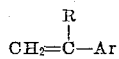

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloro-monofluorostyrenes and the like. Copolymerization of vinylidene cyanide with styrene and substituted styrenes is disclosed in copending application, Serial No. 115,564, filed September 13, 1949, now U. S. Patent 2,615,868, issued October 28, 1952;

(4) Olefins of the general structure

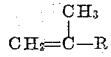

wherein R is an alkyl radical, preferably containing from 1 to 6 carbon atoms, such as isobutylene, (2-methyl propene-1), 2-methylbutene-1, 2-methylpentene-1, 2,3-dimethylbutene-1, 2,3-dimethylpentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in copending application, Serial No. 115,561, filed September 13, 1949, now U. S. Patent 2,615,865, issued October 28, 1952;

(5) Alkyl esters of methacrylic acid which possess the structure

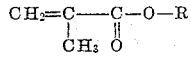

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in copending application, Serial No. 144,198, filed February 14, 1950 now U. S. Patent 2,615,871, issued October 28, 1952;

(6) 2-halogenated monoolefins of the structure

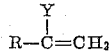

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in copending application, Serial No. 181,588, filed August 25, 1950, now U. S. Patent 2,615,877, issued October 28, 1952;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, iso- propenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylidene cyanide is described in copending application Serial No. 181,571, filed August 25, 1950, now U. S. Patent 2,615,875, issued October 28, 1952;

(8) Vinyl esters of alpha-halo saturated aliphatic monocarboxylic acids of the structure

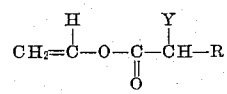

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in copending application, Serial No. 181,572, filed August 25, 1950, now U. S. Patent 2,615,- 876, issued October 28, 1952.

(9) Vinyl halides such as vinyl chloride, vinyl bromide and the like, which are copolymerized with vinylidene cyanide as described in copending application, Serial No. 144,196, filed February 14, 1950, now U. S. Patent 2,615,- 869, issued October 28, 1952.

In addition to solutions containing the two-component interpolymers of vinylidene cyanide containing the essentially 1 to 1 molar alternating structure and essentially 50 mole per cent vinylidene cyanide units, such as those disclosed in the copending applications referred to above, solutions of other vinylidene cyanide interpolymers containing from 45 to 55% vinylidene cyanide are also within the scope of this invention. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in copending application Serial No. 268,463, filed January 26, 1952, now U. S. Patent 2,716,106.

Among the polymerizable monoolefinic compounds which form interpolymers with vinylidene cyanide are included, by way of example, the following classes of compounds:

Monoolefinic hydrocarbons, that is, monomers containing only atoms of hydrogen and carbon such as styrene; alpha-methyl styrene; alpha-ethyl styrene; isobutylene (2-methyl propene-1); 2-methyl-butene-1; 2-methyl-heptene-1; 2,3-dimethyl-hexene-1; 2,3,4-trimethyl-pentene-1; ethylene; propylene; butylene; amylene; hexylene and the like;

Halogenated monoolefinic hydrocarbons, that is, monomers containing carbon, hydrogen and one or more halogen atoms, such as alpha-chlorostyrene; alpha-bromostyrene; 2,5-dichlorostyrene; 3,4-dichlorostyrene; 2,6-dichlorostyrene; dichloro-monofluorostyrenes; 2-chloro-propene; 2-chlorohexene; 4-fluoroheptene; 1,2-dibromoethylene; 1,2-diiodoethylene and the like;

Vinyl esters of inorganic acids such as vinyl chloride, bromoethylene, iodoethylene, and fluoroethylene;

Monoolefinically unsaturated esters such as vinyl acetate, vinyl propionate, vinyl butyrate, vinyl valerate, vinyl caproate, vinyl o-chlorobenzoate, vinyl m-chlorobenzoate and similar vinyl halobenzoates, vinyl p-methoxybenzoate, methyl methacrylate, propyl methacrylate, amyl methacrylate, octyl methacrylate and ethyl tiglate, methyl acrylate, ethyl acrylate, propyl acrylate, isopropyl acrylate, amyl acrylate, 3,5,5-trimethylhexylacrylate and dodecyl acrylate;

Isopropenyl acetate, isopropenyl propionate, isopropenyl valerate, isopropenyl-p-chlorobenzoate, isopropenyl o-bromobenzoate, and isopropenyl alpha-bromopropionate;

Vinyl alpha-chloroacetate, vinyl alpha-bromoacetate, vinyl alpha-chloropropionate and vinyl alpha-chlorobutyrate, vinyl alpha-bromovalerate;

Allyl chloride, allyl cyanide, allyl bromide, allyl fluoride, allyl iodide, allyl nitrate, allyl thiocyanate, allyl butyrate, allyl benzoate, allyl 3,5,5-trimethyl hexoate, allyl lactate, allyl pyruvate, allyl acetoacetate, allyl thioacetate, as well as methyl esters corresponding to the above allyl esters as well as esters from such alkenyl alcohols as beta-ethyl allyl alcohol, beta-propyl allyl alcohol, and 1-buten-4-ol;

Methyl alpha-chloroacrylate, methyl alpha-bromoacrylate, ethyl alpha-chliroacrylate, propyl alpha-chloroacrylate, amyl alpha-chloroacrylate, 3,5,5-trimethyl hexyl alpha-chloroacrylate and decyl alpha-cyano acrylate;

Dimethyl maleate, diethyl maleate, dimethyl fumarate, diethyl fumarate and diethyl glutaconate;

Monoolefinically unsaturated organic nitriles such as acrylonitrile, methacrylonitrile, 1,1-dicyano propene-1, crotonitrile, oleonitrile and the like;

Monoolefinically unsaturated carboxylic acids such as acrylic acid, methacrylic acid, crotonic acid, 3-butenoic acid, angelic acid, tiglic acid and the like;

Other polymerizable monoolefinic monomers may also be polymerized in combinations of two or more with vinylidene cyanide to form the interpolymers of the present invention soluble in nitroalkane solutions. Consequently, the invention includes within its scope interpolymers of vinylidene cyanide with any two or more polymerizable monomers containing a single $CH_2=C<$ group, at least one of which forms an essentially 1:1 alternating copolymer when copolymerized with vinylidene cyanide.

It is thus apparent that this invention contemplates the use of a generic class of interpolymers of vinylidene cyanide with a copolymerizable monoolefinic compound, which interpolymers contain from about 45 to 55 mole per cent of vinylidene cyanide units, and that the nature of the remaining units is not critical.

The solutions of vinylidene cyanide interpolymers in nitroalkanes of this invention are prepared by the methods ordinarily employed in dissolving high polymers. For example, solution may be accomplished simply by placing the polymer, which is generally in the form of a white powder of small particle size, in the solvent, and agitating the mixture until solution is complete. It is also desirable that the polymer solvent mixture be heated slightly, for example at about 40° C. to 80° C., since solution of the polymer is thereby facilitated. In preparing large quantities of polymer solutions, a desirable expedient consists in first cooling the nitroalkane to a temperature at which its solvent power is considerably lowered, adding the polymer while strongly agitating the liquid so that the polymer particles are dispersed in the cooled solvent and then heating the dispersion whereupon the dispersed particles dissolve. By utilizing this method lumping or agglomeration is prevented and solution of the polymer is obtained much more readily.

Solutions having any desired polymer concentration may be prepared since the solvent and polymer utilized in this invention are compatible with one another regardless of precise proportions of each. However, the solvent is generally in considerable excess, to secure a liquid solution, and solutions containing from about 5 to 30 or 40% of polymer are preferred for spinning into fibers or casting into films.

The following examples are intended to illustrate more fully the use of nitroalkanes as solvents for vinylidene cyanide interpolymers, but are not intended to limit the scope of the invention, for it is, of course, possible to effect many modifications therein. In the examples all parts are by weight.

Example I

A series of five solutions containing 12%, 13%, 16.4%, 18% and 19% total solids respectively, is prepared by dissolving the corresponding quantity of a 1 to 1 alternating vinylidene cyanide/vinyl acetate copolymer, having an intrinsic viscosity of 2.5, in nitromethane. The resulting solutions, which are clear and viscous, are then spun through a spinneret having twenty-four 0.005 inch holes into a heated atmosphere of air and the yarn is wound up at a rate of about 30 feet per minute. The yarns thus obtained are silky white and possess a tensile strength of 1 gram per denier.

Example II

Example I is repeated except that nitroethane is substituted for the nitromethane. High quality yarns are again obtained.

Example III

Solutions containing approximately 20% total solids are prepared by dissolving in nitromethane the following interpolymers all containing essentially 50 mole per cent of units of vinylidene cyanide:

Vinylidene cyanide-styrene copolymer
Vinylidene cyanide-vinyl benzoate copolymer
Vinylidene cyanide-isobutylene copolymer
Vinylidene cyanide-methyl methacrylate copolymer
Vinylidene cyanide-vinyl chloride copolymer
Vinylidene cyanide-vinyl acetate-acrylic acid tripolymer The solutions thus obtained are clear and of a viscosity suitable for spinning and casting. The solutions are spun as in Example I and the resulting yarns are silky white and of high denier. A film cast from the vinylidene cyanide/vinyl acetate/acrylic acid tripolymer solution is clear, tough and highly resistant to the action of chemicals.

Moreover, when the above examples are repeated utilizing other of the nitroalkanes disclosed hereinabove or other vinylidene cyanide and interpolymers of the type disclosed hereinabove, polymer solutions are obtained which are clear, viscous and useful for the spinning of filaments and the casting of films.

Although specific examples of the invention have been herein described, it is not intended to limit the invention solely thereto, but to include all of the variations and modifications falling within the spirit and scope of the appended claims.

This application is a continuation in part of our co-pending application Serial No. 115,562 filed September 13, 1949, now U. S. Patent 2,615,866.

We claim:

1. A composition comprising a solution of an interpolymer of vinylidene cyanide with at least one other monoolefinic monomer, said interpolymer containing from about 45 to 55 mole per cent of vinylidene cyanide units, and, as a solvent therefor, a nitroalkane.

2. A composition comprising a solution of a two-component 1 to 1 molar alternating copolymer of vinylidene cyanide with a monoolefinic monomer, and, as a solvent therefor, a nitroalkane.

3. A composition comprising a solution of a two-component 1 to 1 molar alternating copolymer of vinylidene cyanide with a monoolefinic monomer, said copolymer being dissolved in a solvent comprising a compound of the structure $RNO_2$ wherein R is an alkyl radical containing from 1 to 4 carbon atoms.

4. The composition of claim 3 wherein the compound of the structure $RNO_2$ is nitromethane.

5. A composition comprising a solution of a 1 to 1 molar alternating copolymer of vinylidene cyanide with a vinyl ester of an aliphatic monocarboxylic acid, said copolymer being dissolved in a compound of the structure $RNO_2$ wherein R is an alkyl radical containing from 1 to 4 carbon atoms.

6. A composition comprising a solution of a 1 to 1 molar alternating copolymer of vinylidene cyanide with vinyl acetate, said copolymer being dissolved in a solvent comprising a compound of the structure $RNO_2$ wherein R is an alkyl radical containing from 1 to 4 carbon atoms.

7. The composition of claim 6 wherein the compound of the structure $RNO_2$ is nitromethane.

8. A composition comprising a solution of a two-component 1 to 1 molar alternating copolymer of vinylidene cyanide with vinyl chloride, said copolymer being dissolved in a solvent comprising a compound of the structure $RNO_2$ wherein R is an alkyl radical containing from 1 to 4 carbon atoms.

9. A composition comprising a solution of a two-component 1 to 1 molar alternating copolymer of vinylidene cyanide with methyl methacrylate, said copolymer being dissolved in a solvent comprising a compound of the structure $RNO_2$ wherein R is an alkyl radical containing from 1 to 4 carbon atoms.

10. A composition comprising a solution of an interpolymer containing from about 45 to 55 mole percent of vinylidene cyanide, an ester of a monoolefinically unsaturated carboxylic acid and a saturated monohydric alcohol, and an ester of a saturated carboxylic acid and a monoolefinically unsaturated monohydric alcohol, said interpolymer being dissolved in a solvent comprising a compound of the structure $RNO_2$ wherein R is an alkyl radical containing from 1 to 4 carbon atoms.

11. A composition comprising a solution of a two-component 1 to 1 molar alternating copolymer of vinylidene cyanide with styrene, said copolymer being dissolved in a solvent comprising a compound of the structure $RNO_2$ wherein R is an alkyl radical containing from 1 to 4 carbon atoms.

12. A composition comprising a solution of an interpolymer containing from about 45 to 55 mole percent of vinylidene cyanide, vinyl acetate, and methyl methacrylate, said interpolymer being dissolved in a solvent comprising a compound of the structure $RNO_2$ wherein R is an alkyl radical containing from 1 to 4 carbon atoms.

13. A composition comprising a solution of a two-component 1 to 1 molar alternating copolymer of vinylidene cyanide with a monoolefinic ester of an inorganic acid halide, said copolymer being dissolved in a solvent comprising a compound of the structure $RNO_2$ wherein R is an alkyl radical containing from 1 to 4 carbon atoms.

14. A composition comprising a solution of a two-component 1 to 1 molar alternating copolymer of vinylidene cyanide with a monoolefinic ester of a carboxylic acid and an alcohol, said copolymer being dissolved in a solvent comprising a compound of the structure $RNO_2$ wherein R is an alkyl radical containing from 1 to 4 carbon atoms.

15. A composition comprising a solution of a two-component 1 to 1 molar alternating copolymer of vinylidene cyanide with an ester of a monoolefinic monocarboxylic acid and a saturated monohydric alcohol, said copolymer being dissolved in a solvent comprising a compound of the structure $RNO_2$ wherein R is an alkyl radical containing from 1 to 4 carbon atoms.

16. A composition comprising a solution of a two-component 1 to 1 molar alternating copolymer of vinylidene cyanide with an ester of a saturated monocarboxylic acid and a monoolefinic monohydric alcohol, said copolymer being dissolved in a solvent comprising a compound of the structure $RNO_2$ wherein R is an alkyl radical containing from 1 to 4 carbon atoms.

17. A composition comprising a solution of a two-component 1 to 1 molar alternating copolymer of vinylidene cyanide with a monoolefinic compound having the following structural formula

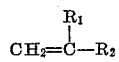

wherein $R_1$ is selected from the class consisting of hydrogen, halogen and alkyl radicals, and $R_2$ is selected from the class consisting of halogen, alkyl, aryl,

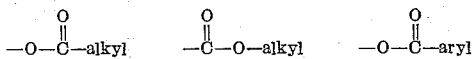

and —COOH groups, said copolymer being dissolved in a solvent comprising a compound of the structure $RNO_2$ wherein R is an alkyl radical containing from 1 to 4 carbon atoms.

18. A composition comprising a solution of an interpolymer of from 45 to 55 mole percent vinylidene cyanide, a monoolefinic monomer different from the vinylidene cyanide and having a $CH_2=C<$ group, and another monoolefinic monomer different from the other said monomers and copolymerizable therewith, said interpolymer being dissolved in a solvent comprising a compound of the structure $RNO_2$ wherein R is an alkyl radical containing from 1 to 4 carbon atoms.

19. A composition comprising a solution of an interpolymer of from 45 to 55 mole percent vinylidene cyanide, a monoolefinic ester of a carboxylic acid and an alcohol and another monoolefinic monomer different from the other monomers and copolymerizable therewith, said interpolymer being dissolved in a solvent comprising a compound of the structure $RNO_2$ wherein R is an alkyl radical containing from 1 to 4 carbon atoms.

References Cited in the file of this patent

UNITED STATES PATENTS 2,589,294   Schmidt et al. _____ Mar. 18, 1952